(12) United States Patent
Cotton

(10) Patent No.: US 11,702,246 B2
(45) Date of Patent: Jul. 18, 2023

(54) STACKABLE CONTAINER SYSTEM AND METHOD

(71) Applicant: The Stack—N—Go LLC, Alhambra, CA (US)

(72) Inventor: Myron Varan Cotton, Alhambra, CA (US)

(73) Assignee: The Stack—N—Go LLC, Alhambra, CA (US)

( * ) Notice: Subject to any disclaimer, the term of this patent is extended or adjusted under 35 U.S.C. 154(b) by 212 days.

(21) Appl. No.: 16/908,555

(22) Filed: Jun. 22, 2020

(65) Prior Publication Data

US 2020/0399019 A1 Dec. 24, 2020

Related U.S. Application Data

(60) Provisional application No. 62/865,098, filed on Jun. 21, 2019.

(51) Int. Cl.
*B65D 21/02* (2006.01)

(52) U.S. Cl.
CPC ...... *B65D 21/0222* (2013.01); *B65D 2255/20* (2013.01); *B65D 2525/284* (2013.01); *B65D 2543/00092* (2013.01)

(58) Field of Classification Search
CPC ....... A45F 5/10; A45F 3/46; B65D 2525/284; B65D 2255/20; B65D 21/0217; B65D 21/0222

USPC ..... 220/23.83, 737, 741, 742; 206/503, 513, 206/508
See application file for complete search history.

(56) References Cited

U.S. PATENT DOCUMENTS

| | | | | |
|---|---|---|---|---|
| 4,505,506 | A * | 3/1985 | Picozza | A45F 3/46 |
| | | | | D7/622 |
| 8,777,043 | B2* | 7/2014 | Furlong | B65D 21/022 |
| | | | | 206/508 |
| 2020/0113317 | A1* | 4/2020 | Okumi | A45F 3/04 |

OTHER PUBLICATIONS

Lunchblox® Lunch Kit Food Storage Containers|Rubbermaid, https://www.rubbermaid.com/lunblox.html, Jan. 4, 2021.
Bentgo® Classic Lunch Box|Betgo®, https://bentgo.com/collections/lunch-boxes/products/bentgo?variant=727065235, Jan. 4, 2021.
Indian-Tiffin—Indian-Tiffin LunchBox, https://indian-tiffin.com, Jan. 4, 2021.

* cited by examiner

*Primary Examiner* — Jeffrey R Allen
(74) *Attorney, Agent, or Firm* — Sheppard, Mullin, Richter & Hampton LLP

(57) ABSTRACT

A food storage system comprising a bottom receptacle, a plurality of stackable containers, a handle configured to extend over a topmost one of the plurality of stackable containers, and a fastening mechanism having a bottom end coupled to the bottom receptacle and a top end coupled to the top lid. A length of the fastening mechanism is adjustable so that a spacing between the bottom receptacle and the handle is adjustable.

23 Claims, 14 Drawing Sheets

STACKABLE CONTAINER SYSTEM AND METHOD

CROSS-REFERENCE TO RELATED APPLICATION

This application claims the benefit of U.S. Provisional Application No. 62/865,098 filed on Jun. 21, 2019 and which is hereby incorporated herein by reference in its entirety.

TECHNICAL FIELD

The disclosed technology relates generally to portable food storage systems, and more particularly, some embodiments relate to portable food storage systems having stackable containers.

DESCRIPTION OF THE RELATED ART

Tiffin carriers are a kind of stacked lunch box used widely in Asia. Normally, a tiffin carrier has from two to four tiers of stacked food containers. The bottom tier, sometimes larger than the others, is commonly used for rice.

Tiffin carriers are usually opened by unlocking a small catch on either side of the handle, which is located above the top tier. The food containers are generally made out of steel or aluminum, but enamel and plastic versions are also known.

Tiffin carriers have not seen wide adoption in the United States, partly because existing tiffin carriers are not adjustable or are not easily adjustable. Some existing tiffin carriers require a food container to be placed in all available tiers, and thus are not adjustable. Other existing tiffin carriers require each food container to be individually fastened to the food containers in adjoining tiers, which makes assembly and disassembly of the tiffin carrier difficult.

BRIEF SUMMARY OF EMBODIMENTS

The present disclosure relates generally to portable food storage systems. There are situations in which a user of a portable food storage system would benefit from a portion-controlled, healthier way to eat on the go.

According to various embodiments of the disclosed technology, there is disclosed a portable food storage system comprising portion-sized containers that can be stacked on top of each other and secured by an adjustable ratcheting mechanism, making it easy to transport microwavable meals and other foods.

Various embodiments of the disclosed technology are directed to systems that provide portable food storage and portion control. In some embodiments, the system may comprise a plurality of food containers, a plurality of lids, a bottom receptacle, and a fastening mechanism. The system may employ a plurality of food containers that can be stacked and that can also be optionally connected by a fastening mechanism, allowing a user to carry and transport multiple containers.

In one embodiment, each food container has a rib projecting outwardly from the sidewall of the food container, allowing the food containers to be nested and stacked together in different arrangements for transportation, storage and/or organization. In another embodiment, the bottom floor of each food container has a sunken central portion and a raised perimeter portion surrounding the sunken central portion. The sunken central portion is configured to nest inside a recessed central portion of a lid of an adjacent food container, while the raised perimeter portion rests upon a raised rim portion of the lid of the adjacent food container.

In one embodiment, top lid has a handle on its top surface and an engaging mechanism on either its side wall or in the handle for a fastening mechanism that connects to the bottom receptacle of the system. The handle of the top lid allows for easy transportation of the system. The fastening mechanism includes a linear rack with a plurality of teeth or holes, a pivotable finger for engaging the linear rack, and a release mechanism.

According to an embodiment of the disclosed technology, the food storage system comprises a bottom receptacle, a plurality of stackable containers, a top lid configured to cover a topmost one of the plurality of stackable containers, and a fastening mechanism having a bottom end coupled to the bottom receptacle and a top end coupled to the top lid. A bottommost one of the plurality of stackable containers may be configured to be at least partially received within the bottom receptacle. A length of the fastening mechanism may be adjustable so that a spacing between the bottom receptacle and the top lid is adjustable.

In one embodiment, each of the plurality of stackable containers comprises a floor having a perimeter and a convex central portion, a first sidewall extending upwardly from the perimeter of the floor, a collar projecting outwardly from a top portion of the first sidewall, and a second sidewall extending upward from an outer portion of the collar. The convex central portion is raised relative to the perimeter of the floor. The collar may define a ledge above the top portion of the first sidewall. The floor of a first one of the plurality of stackable containers may be configured to rest upon the ledge of a second one of the plurality of stackable containers when the plurality of stackable containers are stacked together. The lid of the second container may be configured to fit within the floor of the first container.

In a particular embodiment, each of the plurality of stackable containers further comprises a rib projecting outward from the first sidewall, below the collar. The rib of the first one of the plurality of stackable containers may be configured to rest upon a top portion of the second sidewall of the second one of the plurality of stackable containers when the plurality of stackable containers are stacked together.

In another embodiment, each of the plurality of stackable containers comprises a floor having a perimeter portion and a concave central portion. A sidewall may extend upwardly from the perimeter portion of the floor. The concave central portion is sunken relative to the perimeter portion of the floor, which surrounds the concave central portion. The concave central portion may be configured to fit within a recessed central portion of the lid of an adjacent container, while the perimeter portion rests upon a rim portion of the lid of the adjacent container.

In one embodiment, the top lid comprises a handle, a ceiling having a perimeter, a sidewall extending downward from the perimeter of the ceiling, a ledge extending outward from the sidewall to engage a release mechanism, and a projection extending outward from the sidewall to engage the top end of the fastening mechanism.

In another embodiment, the fastening mechanism comprises a first fastening portion having a bottom end coupled to the bottom receptacle and a top end pivotably coupled to the top lid, as well as a second fastening portion opposite the first fastening portion and having a bottom end coupled to the bottom receptacle and a top end removably couplable to the top lid. The top lid may comprise a handle. The top end of the first fastening portion may be pivotably coupled to one end of the handle, while the top end of the second fastening portion may comprise a pivotable finger that removably couples the top end of the second fastening portion to an opposite end of the handle. The top end of the second fastening portion may further comprise a release mechanism configured to pivot the pivotable finger out of engagement with the handle so that the top lid can be pivoted away from the second fastening portion.

In one embodiment, the food storage system further comprises a plurality of internal lids. Each of the internal lids may comprise a rim portion and a concave central portion having a tab connection between opposing sides of the lid. The tab connection of a first one of the plurality of internal lids may rest upon a bottom portion of the stackable container above it.

In another embodiment, each of the internal lids may comprise a rim portion and a sunken central portion. The sunken central portion may be configured to receive a bottom portion of an immediately adjacent container.

In one embodiment, the fastening mechanism may comprise a linear rack comprising a plurality of teeth, a pivotable finger having an anchor for engaging the teeth of the linear rack, and a release mechanism for releasing the anchor from the teeth of the linear rack. The linear rack may allow movement of the pivotable finger in only one direction when the anchor is engaged with the teeth.

In a particular embodiment, each of the plurality of teeth of the linear rack has an oblique surface and a substantially horizontal surface. The substantially horizontal surface may prevent movement of the pivotable finger in a direction that would increase the length of the fastening mechanism when the anchor is engaged with the teeth of the linear rack.

In another particular embodiment, the linear rack further comprises two sidewalls facing each other on opposite sides of the plurality of teeth.

In an additional particular embodiment, the pivotable finger has an oblique surface and a substantially horizontal surface at one end. The substantially horizontal surface prevents movement of the pivotable finger in a direction that would increase the length of the fastening mechanism when the anchor is engaged with the teeth of the linear rack.

In a further particular embodiment, the fastening mechanism further comprises a housing having a hollow interior for receiving at least a portion of the linear rack and at least a portion of the pivotable finger, a recess for receiving a projection extending outward from the top lid, and a pivotable catch for releasably engaging the projection when the projection is received within the recess. The release mechanism may be configured to release both the pivotal finger from the teeth of the linear rack and the catch from the projection.

In a further particular embodiment, the release mechanism comprises a spring-biased button. The spring-biased button may comprise a torsion spring and may be configured to pivot both the pivotable finger and the pivotable catch when pressed.

In another embodiment, the fastening mechanism may comprise a linear rack comprising a plurality of holes, a pivotable finger having an anchor engaging the holes of the linear rack, and a release mechanism for releasing the anchor from the holes of the linear rack. The holes of the linear rack may prevent linear movement of the pivotable finger when the anchor is engaged in one of the plurality of holes.

In a particular embodiment, the linear rack further comprises two sidewalls facing each other on opposite sides of the plurality of holes.

In another particular embodiment, the fastening mechanism further comprises a finger housing having a hollow interior for receiving at least a portion of the pivotable finger. The finger housing may be sized to fit between the two sidewalls of the linear rack and configured to slide with respect to the linear rack. The fastening mechanism can be shortened or lengthened by sliding the finger housing with respect to the linear rack.

In an additional particular embodiment, the handle has an opening for receiving a projection extending outwardly from the finger on an opposite end of the finger from the anchor. The handle may further have a catch positioned near the opening for releasably engaging the projection when the projection is received in the opening. The release mechanism may be configured to release both the anchor from the holes of the linear rack and the projection from the catch.

In a further particular embodiment, the release mechanism comprises a spring-biased button configured to pivot both the anchor and the projection about a central pivot when pressed.

In one embodiment, the bottom end of the fastening mechanism is pivotably attached to the bottom receptacle.

In one embodiment, the fastening mechanism comprises a first fastening portion having a bottom end coupled to the bottom receptacle and a top end pivotably coupled to the top lid, as well as a second fastening portion opposite the first fastening portion and having a bottom end coupled to the bottom receptacle and a top end removably couplable to the top lid. The first fastening portion may comprise a linear rack comprising a plurality of teeth and a pivotable finger comprising an anchor at a first end for engaging the teeth of the linear rack. The pivotable finger may further comprise a tab at a second end, opposite the first end, for pivoting the pivotable finger about an axis and releasing the anchor from the teeth of the linear rack.

In an additional embodiment, the fastening mechanism comprises a first fastening portion having a bottom end coupled to the bottom receptacle and a top end pivotably coupled to the top lid, as well as a second fastening portion opposite the first fastening portion and having a bottom end coupled to the bottom receptacle and a top end removably couplable to the top lid. The first fastening portion may comprise a linear rack comprising a plurality of holes and a pivotable finger comprising an anchor at a first end for engaging the holes of the linear rack. The handle may comprise a projection configured to engage a second end of the pivotable finger, opposite the first end, for pivoting the pivotable finger about an axis and releasing the anchor from the holes of the linear rack when the handle is pivoted with respect to the first fastening portion.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that, for clarity and ease of illustration, these drawings are not necessarily made to scale.

Figure 1:
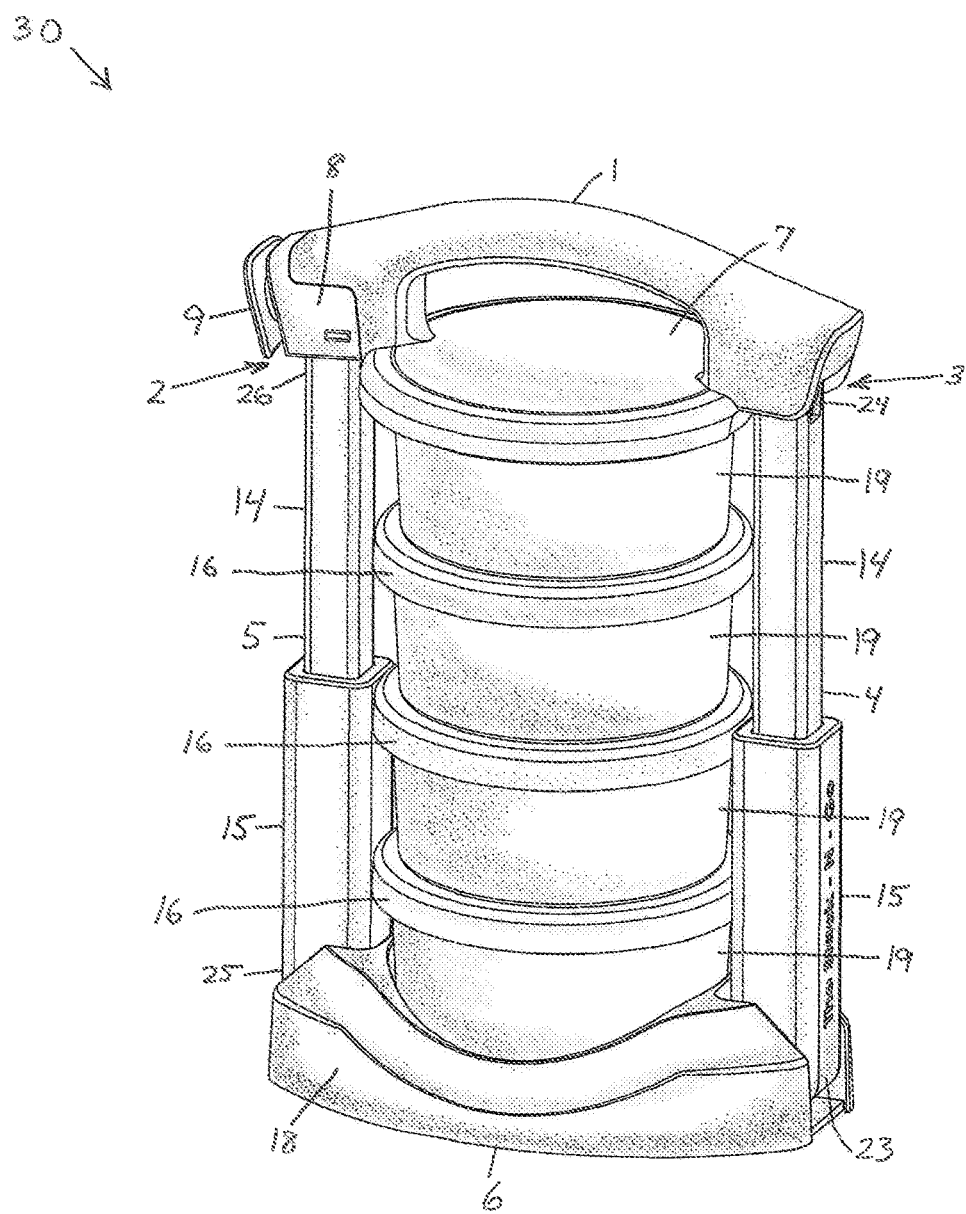
FIG. 1 is a perspective view of food storage system having four food containers, in accordance with one embodiment of the technology described herein.
Figure 2:
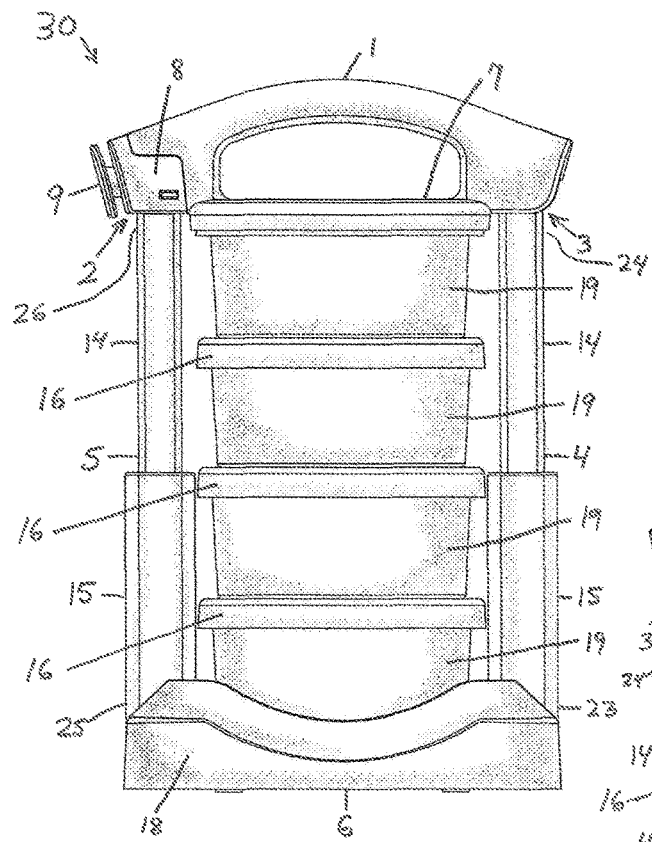
FIG. 2 is a left elevational view of the food storage system shown in FIG. 1.
Figure 3:
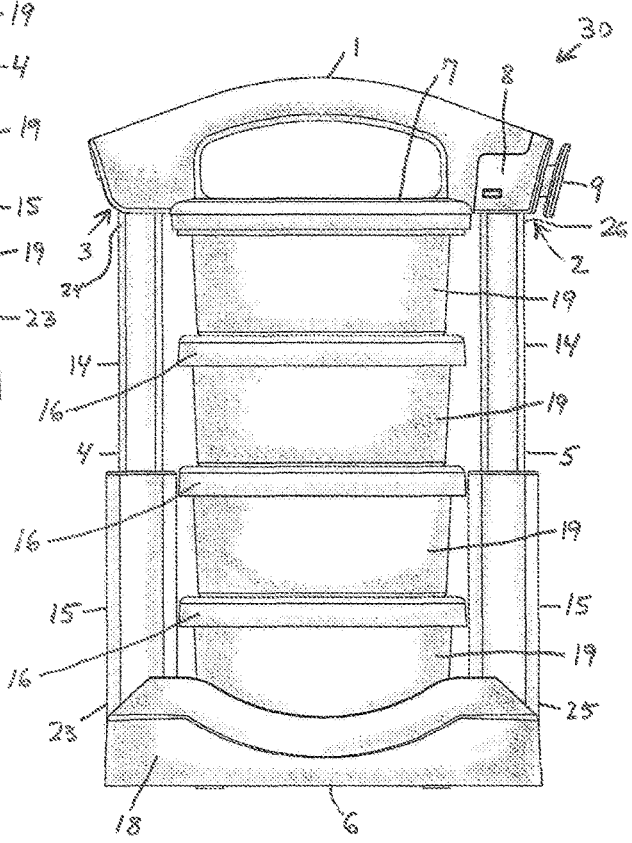
FIG. 3 is a right elevational view of the food storage system shown in FIG. 1.
Figure 4:
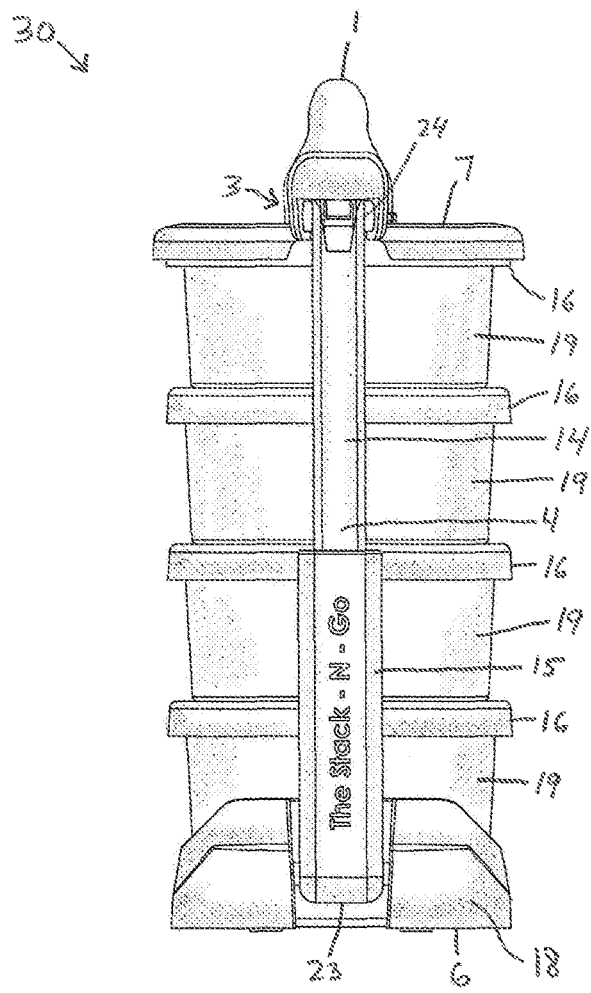
FIG. 4 is a rear elevational view of the food storage system shown in FIG. 1.
Figure 5:
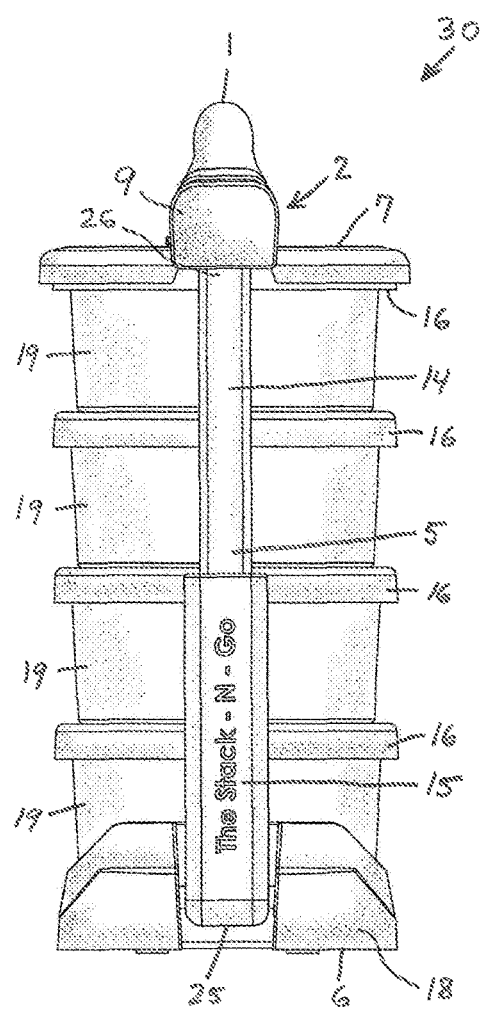
FIG. 5 is a front elevational view of the food storage system shown in FIG. 1.

The figures are not exhaustive and do not limit the disclosure or the disclosed embodiments to the precise form disclosed.

DETAILED DESCRIPTION OF THE EMBODIMENTS

Embodiments of the technology disclosed herein are directed toward devices and methods for providing portable food storage. More particularly, the various embodiments of the technology disclosed herein relate to portable food storage systems having stackable containers.

In the following detailed description, numerous specific details are set forth to provide a fuller understanding of various aspects of the present disclosure. It will be apparent to one of ordinary skill in the art, however, that various aspects of the present disclosure may be practiced without some of these specific details. In other instances, well-known structures and techniques have not been shown in detail to avoid unnecessarily obscuring the present disclosure.

With reference now to the drawings, and in particular to FIGS. 1-7 thereof, there are shown various views of a food storage system 30 comprising a bottom receptacle or base 6, four stackable food containers 19, a top lid or cover 7 configured to cover a topmost one of the plurality of stackable food containers 19 and having a handle 1, a rear telescopic fastening mechanism 4, and a front telescopic fastening mechanism 5. The rear telescopic fastening mechanism 4 has a bottom end 23 pivotably coupled to the bottom receptacle 6 and a top end 24 pivotably coupled to the handle 1. The front telescopic fastening mechanism 5 has a bottom end 25 pivotably coupled to the bottom receptacle 6 and a top end 26 removably couplable to the handle 1. A bottommost one of the plurality of stackable food containers 19 is configured to be at least partially received within the bottom receptacle 6. A length of the rear telescoping fastening mechanism 4 and the front telescoping fastening mechanism 5 is adjustable so that a spacing between the bottom receptacle 6 and the top lid 7 is adjustable.

Figure 8:
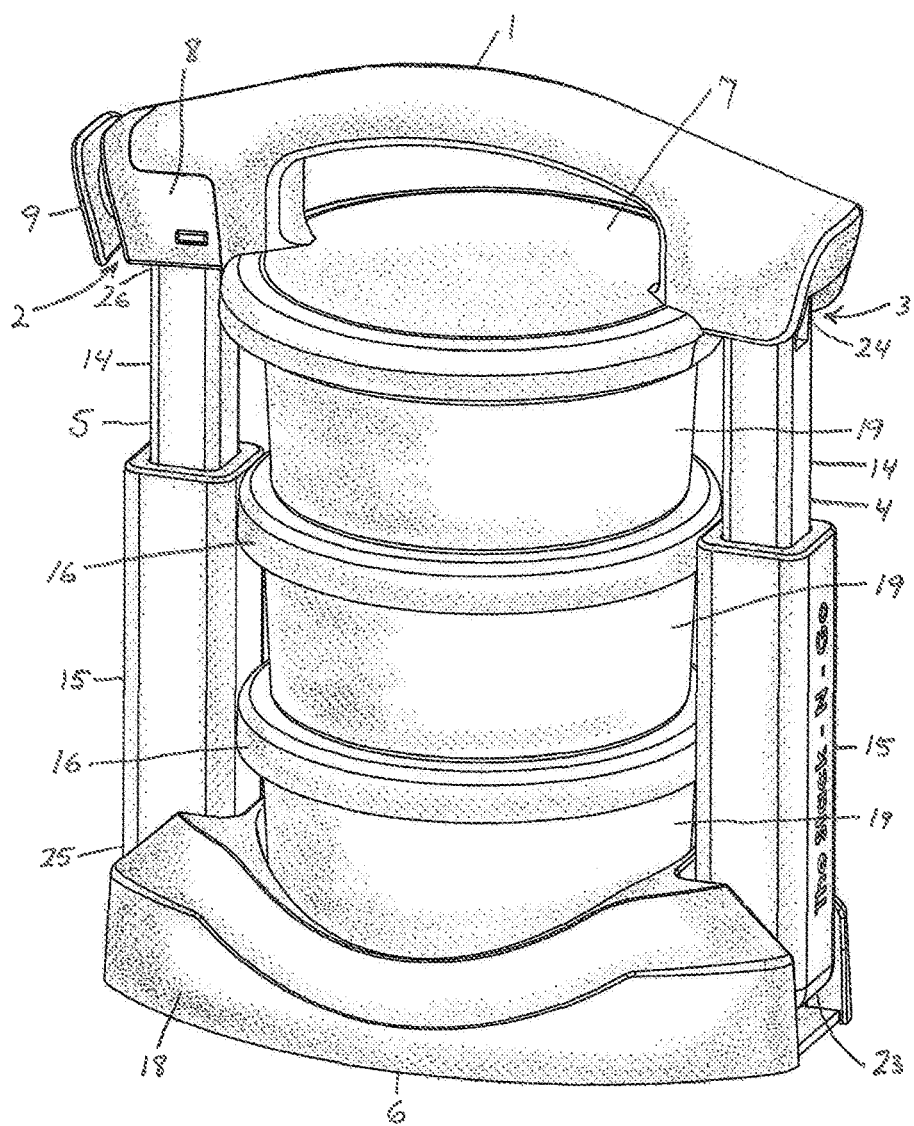
FIG. 8 is a perspective view of a food storage system having three food containers, in accordance with one embodiment of the technology described herein.
Figure 9:
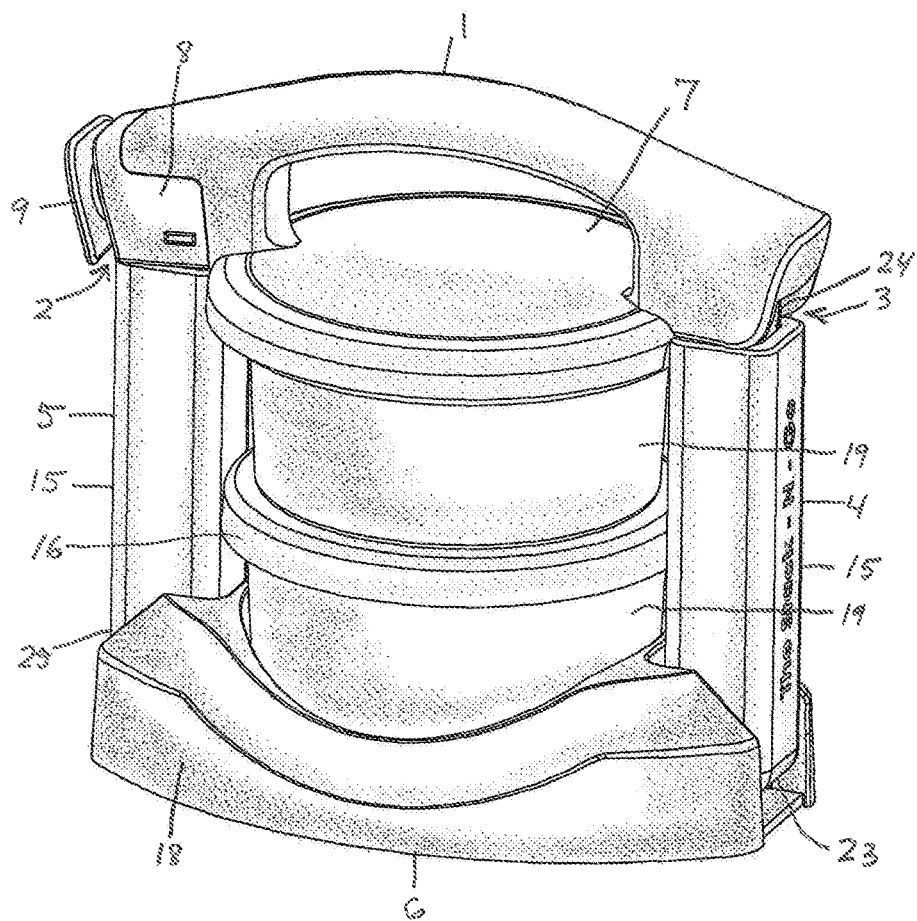
FIG. 9 is a perspective view of a food storage system having two food containers, in accordance with one embodiment of the technology described herein.

Because the spacing between the bottom receptacle 6 and the top lid 7 is adjustable, different numbers of stackable food containers 19 can be placed in the food storage system. With reference to FIG. 8, the food storage system is shown having the spacing between the bottom receptacle 6 and the top lid 7 adjusted to be smaller than shown in FIGS. 1-5, so that only three stackable food containers 19 are placed in the food storage system. With reference to FIG. 9, the food storage system is shown having the spacing between the bottom receptacle 6 and the top lid 7 adjusted to be even smaller than shown in FIG. 8, so that only two stackable food containers 19 are placed in the food storage system.

Figure 6:
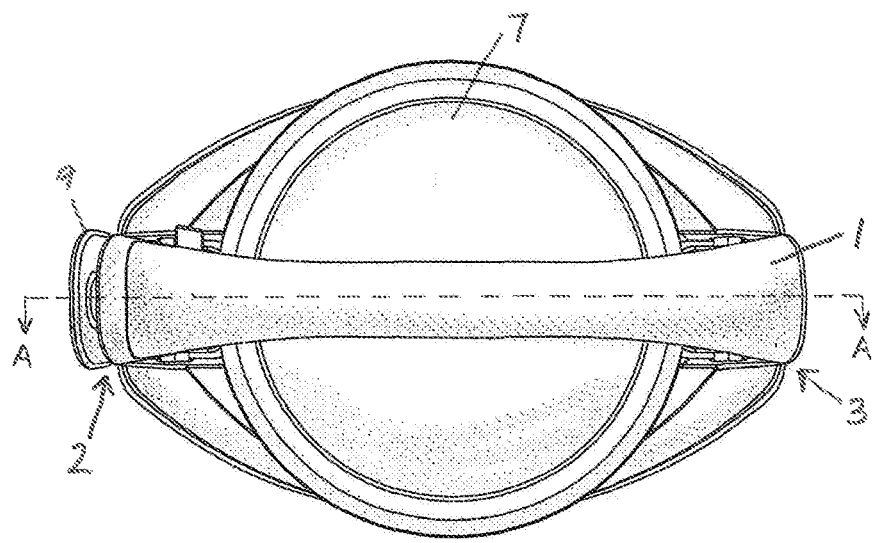
FIG. 6 is a top plan view of the food storage system shown in FIG. 1.
Figure 7:
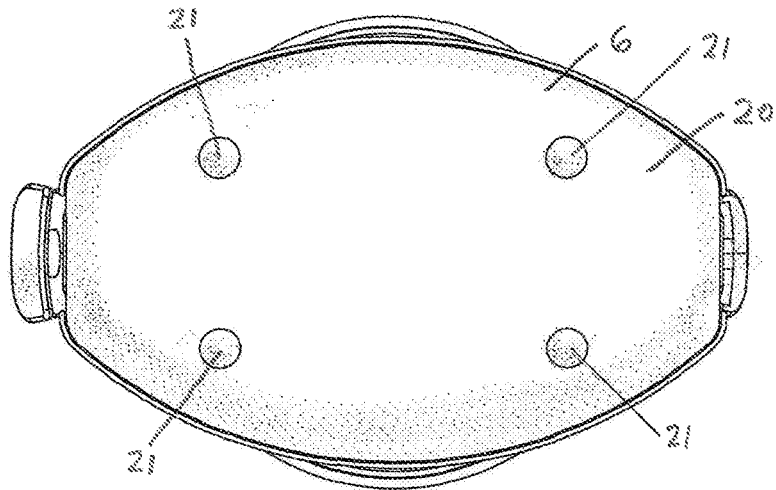
FIG. 7 is a bottom plan view of the food storage system shown in FIG. 1.
Figure 10:
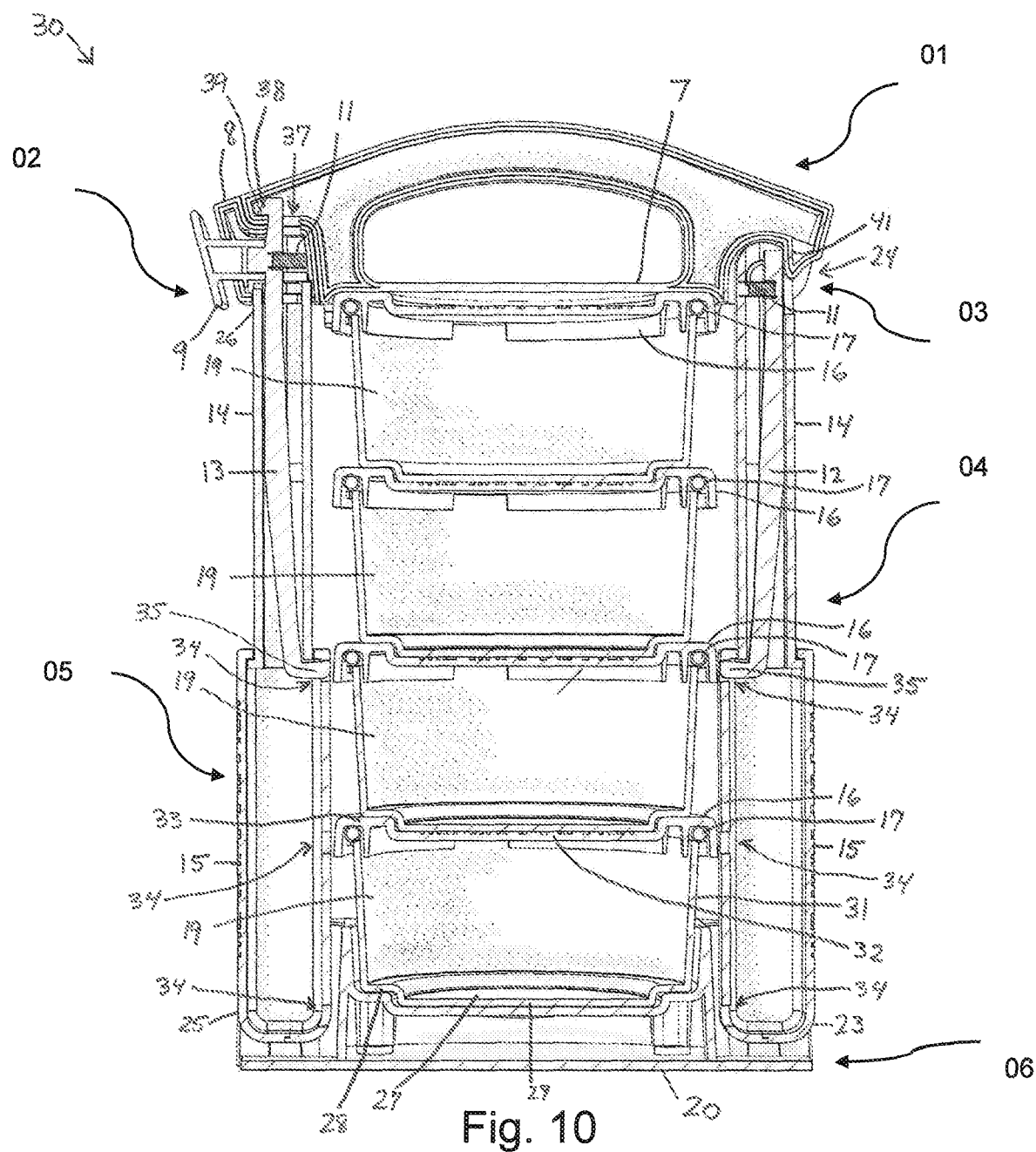
FIG. 10 is a cross-sectional view of the food storage system shown in FIG. 1, taken along the line A-A shown in FIG. 6.

With reference to FIG. 10, there is shown a cross-sectional view of the food storage system 30, taken along the line A-A shown in FIG. 6. As shown in FIG. 10, each of the plurality of stackable containers 19 comprises a floor 27 having a perimeter portion 28 and a concave central portion 29. A sidewall 31 extends upwardly from the perimeter portion 28 of the floor 27. The concave central portion 29 is sunken relative to the perimeter portion 28, which surrounds the concave central portion 29. The concave central portion 29 is configured to fit within a recessed central portion 32 of the lid 16 of an adjacent food container 19, while the perimeter portion 28 rests upon a rim portion 33 of the lid 16 of the adjacent container 19.

The rear telescopic fastening mechanism 4 has a bottom end 23 pivotably coupled to the bottom receptacle 6 and a top end 24 pivotably coupled to the handle 1. The front telescopic fastening mechanism 5 is located opposite the rear telescopic fastening mechanism 4 and has a bottom end 25 pivotably coupled to the bottom receptacle 6 and a top end 26 removably couplable to the handle 1 via a front locking mechanism or finger 13. Thus, the top end 24 of the rear telescopic fastening mechanism 4 is pivotably coupled to one end of the handle 1, while the top end 26 of the front telescopic fastening mechanism 5 comprises a pivotable finger 13 that removably couples the top end 26 of the front telescopic fastening mechanism 5 to an opposite end of the handle 1. The handle 1 comprises a release mechanism 2 configured to pivot the pivotable finger 13 out of engagement with the handle 1 so that the top lid 7 can be pivoted away from the front telescopic fastening mechanism 5.

Each of the internal lids 16 comprises a rim portion 33 and a sunken or recessed central portion 32. The recessed central portion 32 is configured to receive a concave central portion 29 of an immediately adjacent food container 19. Each of the internal lids 16 further comprises a rubber gasket 17 to assist with sealing the food containers 19.

Figure 11:
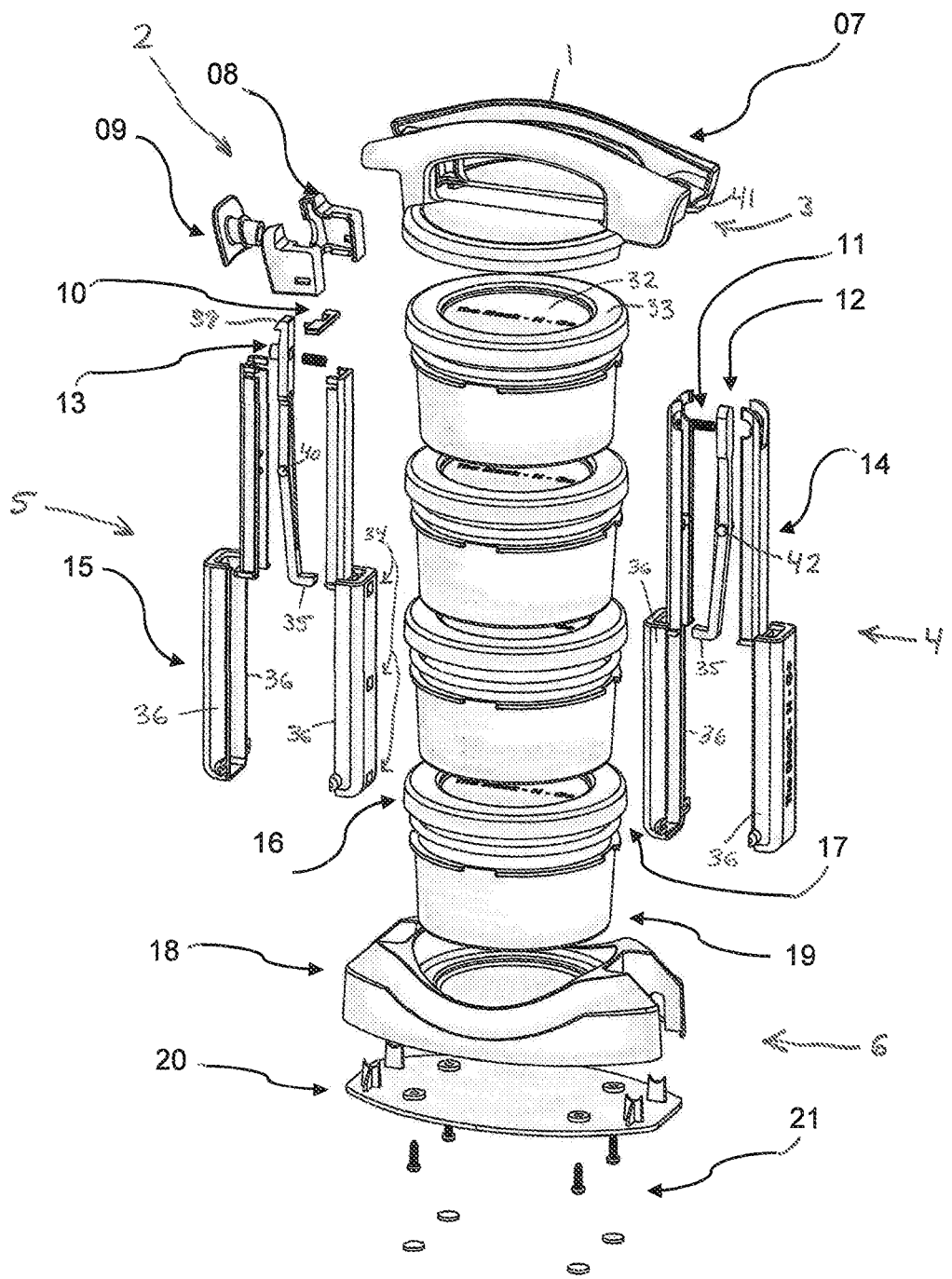
FIG. 11 is an exploded view of a food storage system having four food containers, in accordance with one embodiment of the technology described herein.

With reference to FIG. 11, there is shown an exploded view of the food storage system 30 having four food containers 19. As shown in FIG. 11, each of the rear telescopic fastening mechanism 4 and the front telescopic fastening mechanism 5 comprises a telescopic housing having a thinner portion in the form of a finger housing 14 and a thicker portion in the form of a linear rack 15. The linear rack 15 comprises a plurality of holes 34, a locking mechanism in the form of a pivotable finger 12 or 13 having an anchor 35 for engaging the holes 34 of the linear rack 15, and a release mechanism 2 or 3 for releasing the anchor 35 from the holes 34 of the linear rack 15. The holes 34 of the linear rack 15 prevent linear movement of the pivotable finger 12 or 13 when the anchor 35 is engaged in one of the plurality of holes 34. The linear rack 15 further comprises two sidewalls 36 facing each other on opposite sides of the plurality of holes 34.

Each of the rear telescopic fastening mechanism 4 and the front telescopic fastening mechanism 5 further comprises a finger housing 14 having a hollow interior for receiving at least a portion of the pivotable finger 12 or 13. The finger housing 14 is sized to fit between the two sidewalls 36 of the linear rack 15 and is configured to slide with respect to the linear rack 15. Each of the rear telescopic fastening mechanism 4 and the front telescopic fastening mechanism 5 can be shortened or lengthened by sliding the finger housing 14 with respect to the linear rack 15.

The bottom receptacle 6 comprises a bottom base 18, a bottom plate 20, and a plurality of screws for fastening the bottom plate 20 18 to the bottom base 18.

Referring again to FIG. 10, the handle 1 has an opening 37 for receiving a projection 38 extending outwardly from the finger 13 on an opposite end of the finger 13 from the anchor 35. The handle 1 further has a catch 39 positioned near the opening 37 for releasably engaging the projection 38 when the projection 38 is received in the opening 37. For the front telescopic fastening mechanism 5, the release mechanism 2 is configured to release both the anchor 35 from the holes 34 of the linear rack 15 and the projection 38 from the catch 39.

The release mechanism 2 comprises a spring-biased button 9 configured to pivot both the anchor 35 and the projection 38 about a central pivot 40 when pressed. The button 9 is housed within a button housing 8 attached via a button locking slider 10 at the top end 26 of the front telescopic fastening mechanism 5. Pressing the button 9 pivots the projection 38 of the finger 13 away from the catch 39 of the handle 1, while simultaneously pivoting the anchor of the finger 13 out of one of the plurality of holes 34 of the linear rack 15. The finger housing 14 may then be slid upwardly or downwardly with respect to the linear rack 15 in order to increase or decrease the length of the front telescopic fastening mechanism 5.

The bottom end 23 of the rear telescopic fastening mechanism 4 is pivotably attached to the bottom receptacle 6. The bottom end 25 of the front telescopic fastening mechanism 5 is also pivotably attached to the bottom receptacle 6. The top end 24 of the rear telescopic fastening mechanism 4 is pivotably attached to the handle 1. The top end 26 of the front telescopic fastening mechanism 5 is removably couplable to the handle 1. The handle 1 comprises a release mechanism 3 having a projection 41 configured to engage an end of the pivotable finger 12, opposite the anchor 35, for pivoting the pivotable finger 12 about a central pivot 42 and releasing the anchor 35 from the holes 34 of the linear rack 15 when the handle 1 is pivoted with respect to the rear telescopic fastening mechanism 4. The finger housing 14 may then be slid upwardly or downwardly with respect to the linear rack 15 in order to increase or decrease the length of the rear telescopic fastening mechanism 4. The anchor 35 of the pivotable finger 12 is biased toward the holes 34 of the linear rack 15 by a spring 11 within the finger housing 14.

In operation, 2-4 food containers 19 are filled with food and then covered with the internal lids 16. The covered food containers 19 are then stacked one on top of the other atop the base receptacle 6. Next, the rear fastening mechanism 4 and the front fastening mechanism 5 are pivoted upright with respect to the base receptacle 6, so that the fastening mechanisms 4 and 5 are positioned next to the stacked food containers 19.

If needed, the lengths of the rear fastening mechanism 4 and the front fastening mechanism 5 are adjusted by sliding the finger housing 14 with respect to the linear rack 15. For the rear fastening mechanism 4, pivoting the handle 1 will press the projection 41 of the handle 1 against the finger 12, disengaging the anchor 35 of the finger 12 from one of the plurality of holes 34 in the linear rack 15. For the front fastening mechanism 5, pressing the button 9 will push the finger 13 so that the anchor 35 disengages from one of the plurality of holes 34. The finger housing 14 can then be slid with respect to the linear rack 15 to adjust the lengths of the fastening mechanisms 4 and 5. Once the lengths of the rear fastening mechanism 4 and the front fastening mechanism 5 are properly adjusted for the number of stacked food containers 19, the handle 1 and the top lid 17 can be pivoted over the topmost food container 19 and secured to the front fastening mechanism 5 by the projection 38 of the finger 13 extending through the opening 37 in the handle 1 and engaging the catch 39.

To release the stacked food containers 19, the button 9 is pressed, which pivots the projection 39 of the finger 13 out of engagement with the catch 38 of the handle 1. The handle 1 and the top lid 7 are then pivoted away from the topmost food container 19 so that all of food containers 19 can be accessed.

Figure 12A:
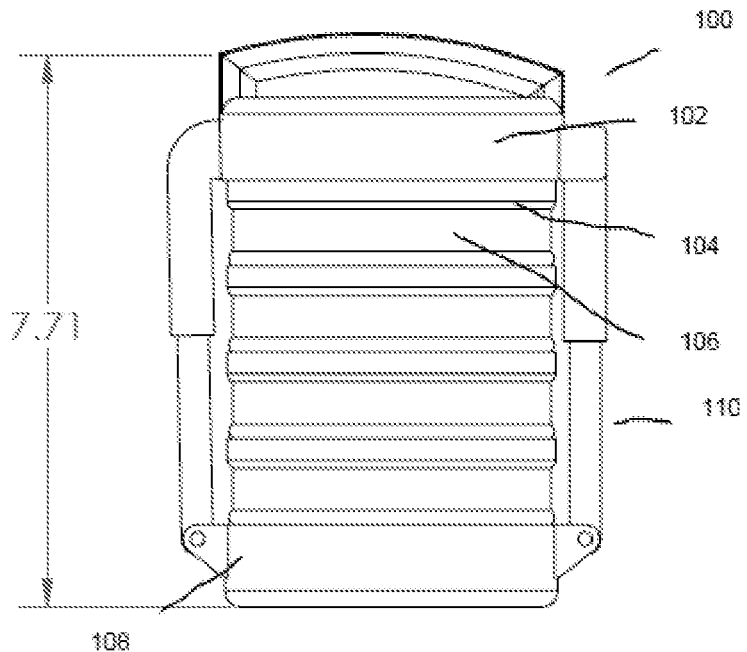
FIG. 12A is a left side elevational view of a food storage system having four food containers, in accordance with another embodiment of the technology described herein.
Figure 12B:
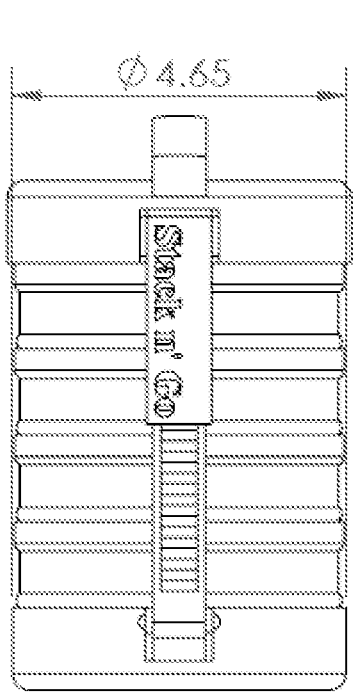
FIG. 12B is a rear elevational view of the food storage system shown in FIG. 12A.
Figure 12C:
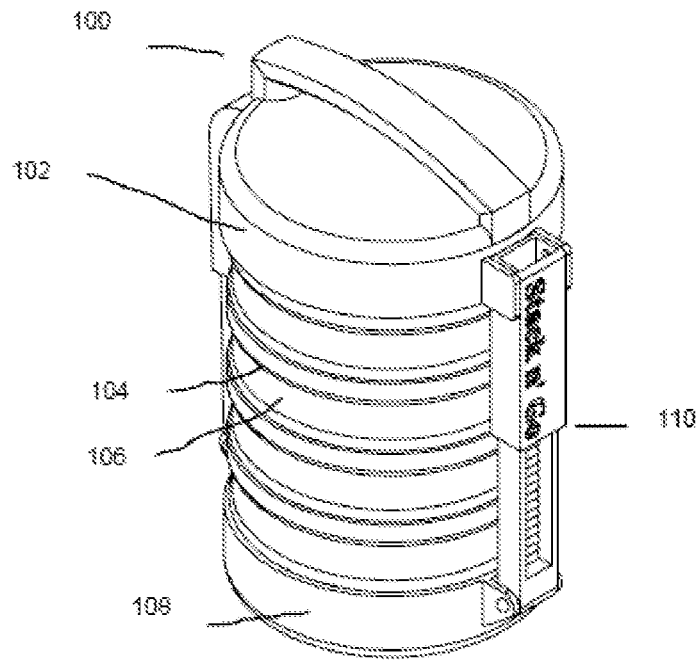
FIG. 12C is a perspective view of the food storage system shown in FIG. 12A.

FIGS. 12A, 12B and 12C are different views of another embodiment of a storage system 100. The system 100 is for use in connection with food transportation, storage, and portioning. In some embodiments, the food storage system 100 may comprise a top lid 102, a plurality of internal lids 104, a plurality of containers 106, a bottom receptacle 108, a fastening mechanism 110, and/or other elements. The overall size (e.g., thickness/girth, length, or other dimensions), form, and/or shape of the system can vary amongst different embodiments.

Figure 13A:
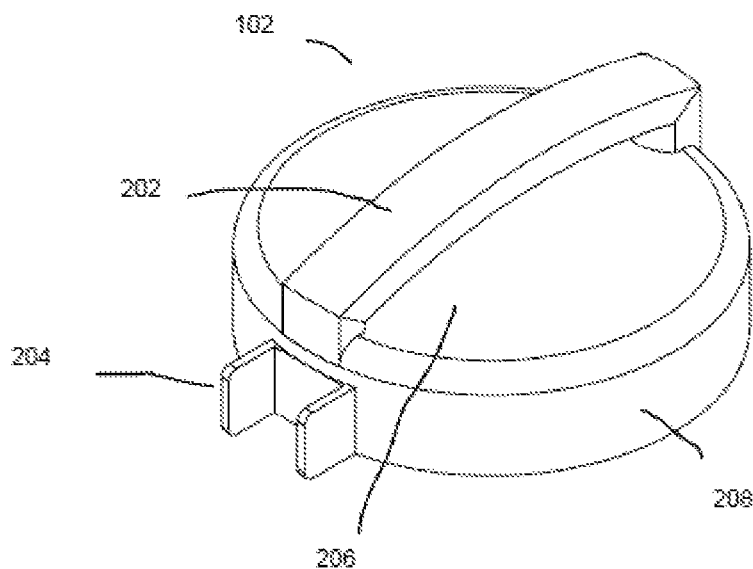
FIG. 13A is a perspective view of a top lid for a food storage system, in accordance with one embodiment of the technology described herein.
Figure 13B:
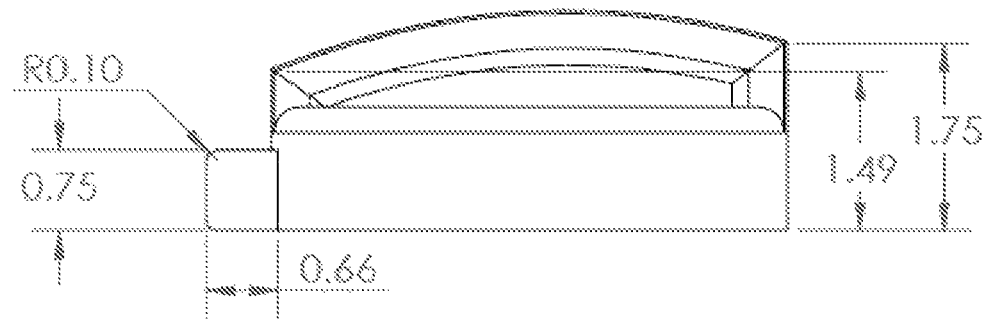
FIG. 13B is a right elevational view of the top lid shown in FIG. 13A.

FIGS. 13A and 13B show structural details of an exemplary top lid 102. The top lid 102 may comprise a handle 202, a projection 204, a ceiling 206, a sidewall 208, a ledge (not shown), and/or other components. The handle 202 may be affixed to the exterior surfaces of the ceiling 206, making it easy to grasp. The ceiling 206 has a perimeter that may be attached to the sidewall 208, which extends downward from the perimeter of the ceiling 206. In order to engage the fastening mechanism 110, the top lid 102 may include the projection 204 and the ledge, both extending outwardly from sidewall 208, across from each other.

Figure 14:
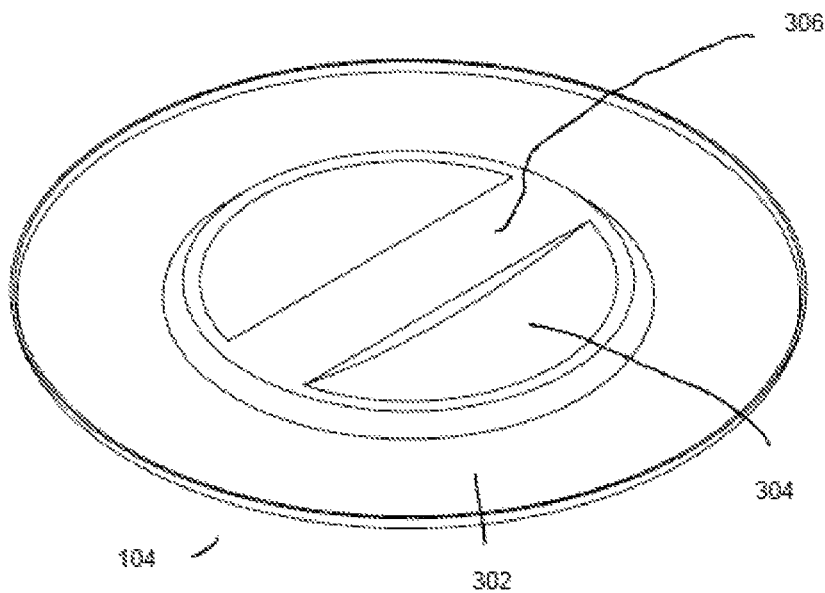
FIG. 14 is a perspective view of an internal lid for a food storage system, in accordance with one embodiment of the technology described herein.

FIG. 14 shows structural details of an exemplary internal lid 104. In some embodiments, each internal lid 104 may comprise a rim portion 302, a concave central portion 304, a tab 306, and/or other components. The internal lid 104 fits onto the bottom of a container 106 above it, so that the tab is received within the convex central portion of the container. In this in-use configuration, the lid 104 would cover and close off the opening of the container 106 to seal it.

Figure 15A:
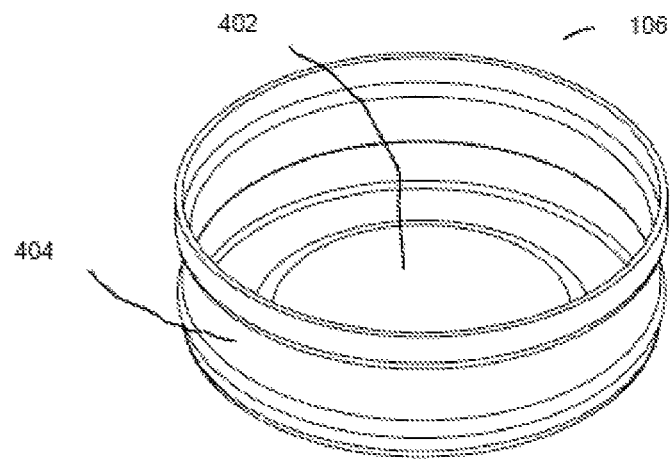
FIG. 15A is a perspective view of a stackable food container for a food storage system, in accordance with one embodiment of the technology described herein.
Figure 15B:
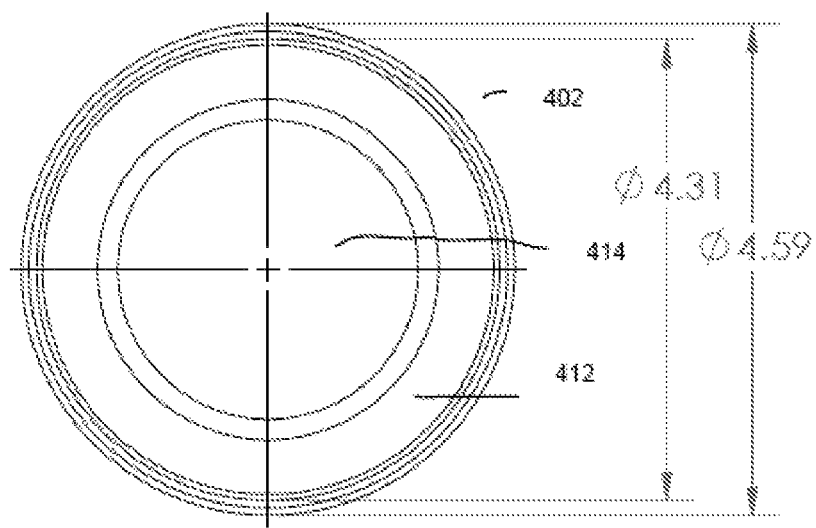
FIG. 15B is a top plan view of the stackable food container shown in FIG. 15A.
Figures 15C, 15E:
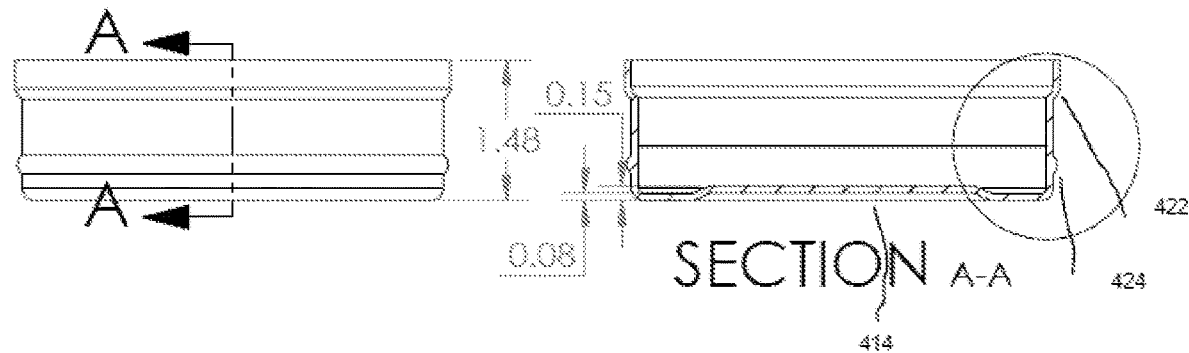
FIG. 15C is a cross-sectional view of the stackable food container shown in FIG. 15A, taken along the line A-A shown in FIG. 15E.
FIG. 15E is a side elevational view of the stackable food container shown in FIG. 15A.
Figure 15D:
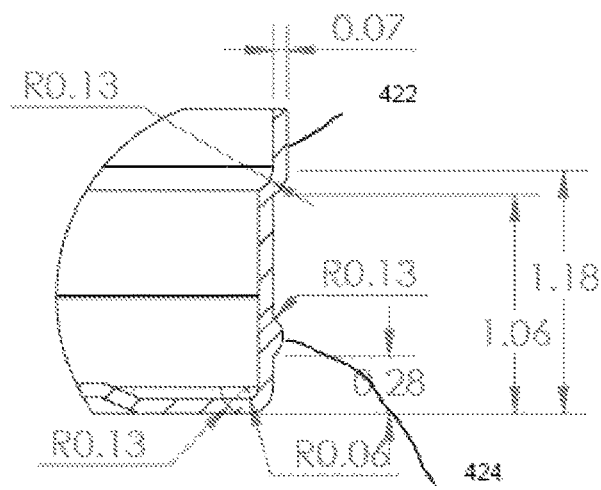
FIG. 15D is a detailed view of FIG. 15C, showing a collar and a rib projecting outwardly from the sidewall of the stackable food container.

FIGS. 15A-15D illustrate different views of an exemplary embodiment of a container 106. As seen in FIG. 15A, the container 106 may comprise a floor 402, a sidewall 404, and/or other components. FIG. 15B provides a top view of the floor 402 of the container 106. The floor 402 may comprise a perimeter 412 and a central portion 414. As shown in FIG. 15C, the interior surface 414 is convex to allow the container to receive the tab of the interior lid 104 when the containers are stacked. The sidewall 404 may comprise a collar 422 and a rib 424, as seen in FIGS. 15C and 15D. The collar 422 may project outwardly from a top portion of the sidewall 404, with the collar 422 defining a ledge on the top portion of the sidewall 404. The rib 424 may also project outwardly from the sidewall 404, below the collar. The floor 402 of a first container 106 is configured to fit within the collar 422, thereby resting on the ledge of another container 106, and the rib 422 is configured to rest upon a top portion of the sidewall 404 of another container 106, so that multiple containers can be stackable together.

Figure 16:
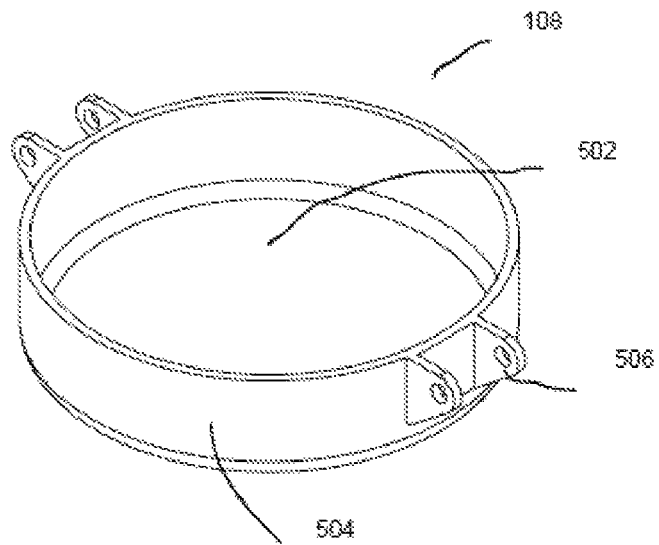
FIG. 16 is a perspective view of a bottom receptacle for a food storage system, in accordance with one embodiment of the technology described herein.
Figures 17, 18:
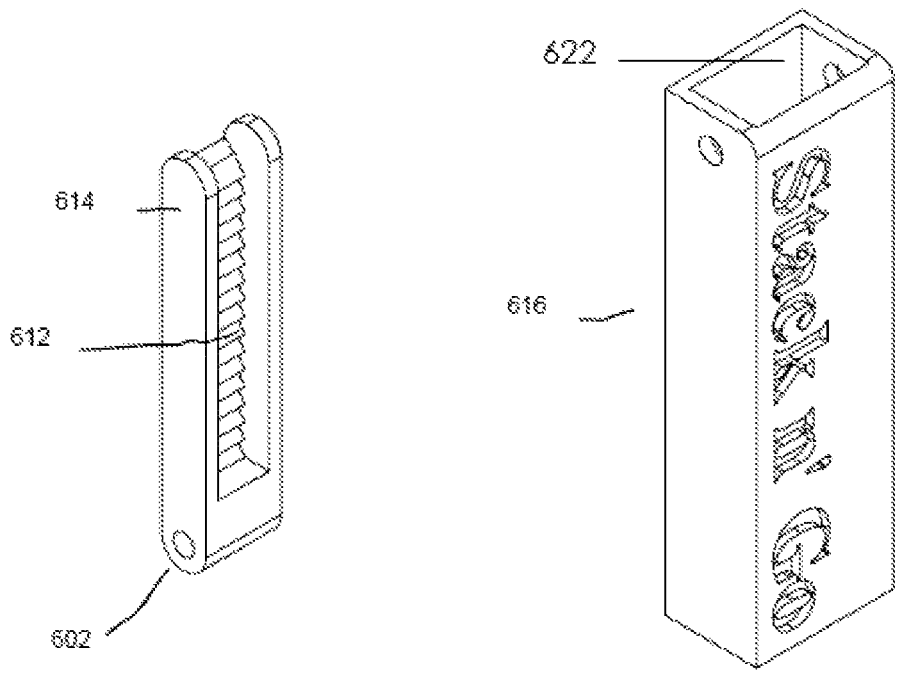
FIG. 17 is a perspective view of a linear rack for a fastening mechanism of a food storage system, in accordance with one embodiment of the technology described herein.
FIG. 18 is a perspective view of a housing for a fastening mechanism of a food storage system, in accordance with one embodiment of the technology described herein.
Figure 19:
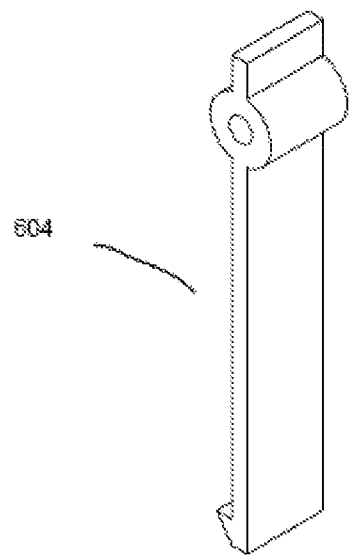
FIG. 19 is a perspective view of a pivotable finger for a fastening mechanism of a food storage system, in accordance with one embodiment of the technology described herein.
Figure 20:
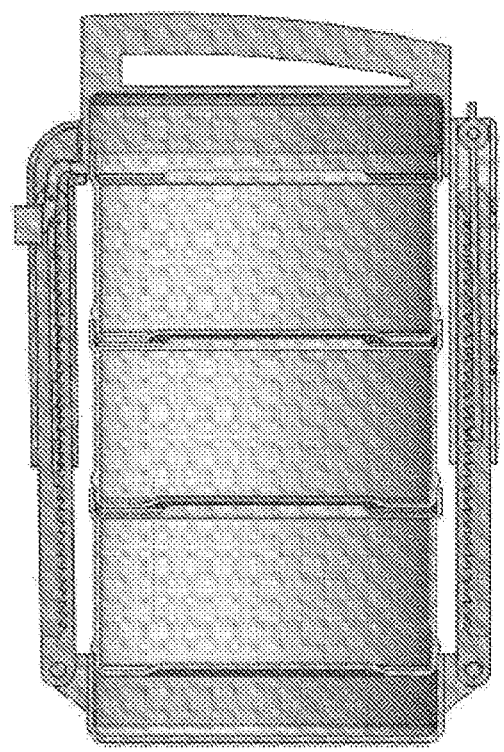
FIG. 20 is a cut-away side elevational view of a food storage system show details of the fastening mechanism, in accordance with one embodiment of the technology described herein.

FIG. 16 illustrates an exemplary embodiment of a bottom receptacle 108. The bottom receptacle 108 may comprise a floor 502, a sidewall 504, projections 506, and/or other components. The floor 502 of the bottom receptacle 108 may be configured to house a container 106. The projections 506 may be configured to engage with the fastening mechanism to secure the stacked containers.

In some embodiments, the fastening mechanism 110 may comprise a linear rack 602 (FIG. 6), a pivotable finger 604 (FIG. 9), a release mechanism 606 (FIG. 8A), a housing unit 616 (FIG. 7) and/or 618 (FIG. 8B), and/or other components. The linear rack 602 may comprise a plurality of teeth 612 for engaging with a pivotable finger 604. The plurality of teeth 612 have an oblique surface and a substantially horizontal surface, two sidewalls 614 facing each other, and/or other components. The pivotable finger 604 has an oblique surface and a substantially horizontal surface at one end. The plurality of teeth 612 prevent movement of the pivotable finger 604 in a direction that would increase the length of the fastening mechanism 110, when the two are coupled. The housing unit 616 has a hollow interior 622 for receiving at least a portion of the linear rack 602 and at least a portion of the pivotable finger 604. The housing unit 618 has a hollow interior 628 for receiving at least a portion of the linear rack 602 and at least a portion of the pivotable finger 604; a recess 626 for receiving a projection 204 extending outwardly from a top lid 102; and a pivotable catch for engaging the projection when the same is received within the recess.

In some embodiments, the fastening mechanism 110 may be pivotably coupled to the bottom receptacle 108. In some embodiments, the fastening mechanism 110 may further be coupled to the top lid 102. The fastening mechanism 110 may be permanently coupled to the top lid 102. The fastening mechanism 110 may also be removably coupled to top lid 102.

The release mechanism 606 may comprise a spring-biased button to pivot the pivotable finger 604 when pressed, releasing both the pivotable finger 604 from the teeth of the linear rack 602 and the catch from the projection 204. The spring-biased button may be a torsion spring and/or any other type of spring.

Although the disclosed technology is described above in terms of various exemplary embodiments and embodiments, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

What is claimed is:

1. A food storage system comprising:
    a bottom receptacle;
    a top lid;
    a plurality of stackable containers, a bottommost one of the plurality of stackable containers configured to be at least partially received within the bottom receptacle;
    a handle configured to extend over a topmost one of the plurality of stackable containers; and
    a telescopic fastening mechanism having a bottom end coupled to the bottom receptacle and a top end coupled to the top lid;
    wherein a length of the fastening mechanism is adjustable so that a spacing between the bottom receptacle and the handle is adjustable.

2. The food storage system of claim 1, wherein each of the plurality of stackable containers comprises:
    a floor having a perimeter portion and a sunken central portion;
    a sidewall extending upwardly from the perimeter portion of the floor; and
    a removable lid having a rim portion and a recessed central portion;
    wherein the sunken central portion is configured to fit within the recessed central portion of the lid of an adjacent container, while the perimeter portion rests upon the rim portion of the lid of the adjacent container.

3. The food storage system of claim 1, wherein the fastening mechanism comprises:
a first fastening portion having a bottom end coupled to the bottom receptacle and a top end pivotably coupled to the handle; and
a second fastening portion opposite the first fastening portion and having a bottom end coupled to the bottom receptacle and a top end removably couplable to the handle.

4. The food storage system of claim 3, wherein the second fastening portion comprises a pivotable finger that removably couples the top end of the second fastening portion to the handle.

5. The food storage system of claim 4, wherein the top end of the second fastening portion further comprises a release mechanism configured to pivot the pivotable finger out of engagement with the handle so that the handle can be pivoted away from the second fastening portion.

6. The food storage system of claim 1, further comprising a plurality of internal lids;
wherein each of the plurality of internal lids comprises a rim portion, and
a sunken central portion configured to receive a bottom portion of an immediately adjacent container.

7. The food storage system of claim 1, wherein the fastening mechanism comprises:
a linear rack comprising a plurality of holes; and
a pivotable finger having an anchor for engaging the plurality of holes of the linear rack;
wherein the plurality of holes of the linear rack prevent linear movement of the pivotable finger with respect to the linear rack when the anchor is engaged in one of the plurality of holes.

8. The food storage system of claim 7, further comprising a release mechanism for releasing the anchor from the plurality of holes of the linear rack.

9. The food storage system of claim 7, wherein the linear rack further comprises two sidewalls facing each other on opposite sides of the plurality of holes.

10. The food storage system of claim 9, wherein, the fastening mechanism further comprises a finger housing having a hollow interior for receiving at least a portion of the pivotable finger, the finger housing being sized to fit between the two sidewalls of the linear rack and configured to slide with respect to the linear rack.

11. The food storage system of claim 10, wherein the fastening mechanism can be shortened or lengthened by sliding the finger housing with respect to the linear rack.

12. The food storage system of claim 7, wherein the handle comprises:
an opening for receiving a projection extending outwardly from the finger on an opposite end of the finger from the anchor; and
a catch positioned near the opening for releasably engaging the projection when the projection is received in the opening.

13. The food storage system of claim 12, further comprising a release mechanism configured to release both the anchor from the plurality of holes of the linear rack and the projection from the catch.

14. The food storage system of claim 13, wherein the release mechanism comprises a spring-biased button.

15. The food storage system of claim 14, wherein the spring-biased button is configured to pivot both the anchor and the projection about a central pivot on the pivotable finger when pressed.

16. The food storage system of claim 14, wherein the spring-biased button comprises a torsion spring.

17. The food storage system of claim 1, wherein the bottom end of the fastening mechanism is pivotably attached to the bottom receptacle.

18. The food storage system of claim 1, wherein the fastening mechanism comprises:
a first fastening portion having a bottom end coupled to the bottom receptacle and a top end pivotably coupled to the handle; and
a second fastening portion opposite the first fastening portion and having a bottom end coupled to the bottom receptacle and a top end removably couplable to the handle;
wherein the first fastening portion comprises
a linear rack comprising a plurality of holes, and
a pivotable finger comprising an anchor at a first end for engaging the plurality of holes of the linear rack.

19. The food storage system of claim 18, wherein the handle comprises a projection configured to engage a second end of the pivotable finger, opposite the first end, for pivoting the pivotable finger about an axis and releasing the anchor from the plurality holes of the linear rack when the handle is pivoted with respect to the first fastening portion.

20. A food storage system comprising:
a bottom receptacle;
a top lid;
a plurality of stackable containers, a bottommost one of the plurality of stackable containers configured to be at least partially received within the bottom receptacle;
a handle configured to extend over a topmost one of the plurality of stackable containers; and
a fastening mechanism having a bottom end coupled to the bottom receptacle and a top end coupled to the top lid, the fastening mechanism comprising
a linear rack comprising
a plurality of holes, and
two sidewalls facing each other on opposite sides of the plurality of holes,
a pivotable finger having an anchor for engaging the plurality of holes of the linear rack, and
a finger housing having a hollow interior for receiving at least a portion of the pivotable finger, the finger housing being sized to fit between the two sidewalls of the linear rack and configured to slide with respect to the linear rack;
wherein a length of the fastening mechanism is adjustable so that a spacing between the bottom receptacle and the handle is adjustable; and
wherein the plurality of holes of the linear rack prevent linear movement of the pivotable finger with respect to the linear rack when the anchor is engaged in one of the plurality of holes.

21. The food storage system of claim 20, wherein the fastening mechanism can be shortened or lengthened by sliding the finger housing with respect to the linear rack.

22. A food storage system comprising:
a bottom receptacle;
a top lid;
a plurality of stackable containers, a bottommost one of the plurality of stackable containers configured to be at least partially received within the bottom receptacle;
a handle configured to extend over a topmost one of the plurality of stackable containers;
a fastening mechanism having a bottom end coupled to the bottom receptacle and a top end coupled to the top lid, the fastening mechanism comprising a linear rack, and
a pivotable finger having an anchor for engaging the plurality of holes of the linear rack; and
a release mechanism comprising a spring-biased button;
wherein a length of the fastening mechanism is adjustable so that a spacing between the bottom receptacle and the handle is adjustable;
wherein the plurality of holes of the linear rack prevent linear movement of the pivotable finger with respect to the linear rack when the anchor is engaged in one of the plurality of holes;
wherein the handle comprises:
an opening for receiving a projection extending outwardly from the finger on an opposite end of the finger from the anchor, and
a catch positioned near the opening for releasably engaging the projection when the projection is received in the opening;
wherein the release mechanism is configured to release both the anchor from the plurality of holes of the linear rack and the projection from the catch; and
wherein the spring-biased button is configured to pivot both the anchor and the projection about a central pivot on the pivotable finger when pressed.

23. A food storage system comprising:
a bottom receptacle;
a top lid;
a plurality of stackable containers, a bottommost one of the plurality of stackable containers configured to be at least partially received within the bottom receptacle;
a handle configured to extend over a topmost one of the plurality of stackable containers; and
a fastening mechanism having a bottom end coupled to the bottom receptacle and a top end coupled to the top lid, the fastening mechanism comprising
a first fastening portion having a bottom end coupled to the bottom receptacle and a top end pivotably coupled to the handle, the first fastening portion comprising
a linear rack comprising a plurality of holes, and
a pivotable finger comprising an anchor at a first end for engaging the plurality of holes of the linear rack; and
a second fastening portion opposite the first fastening portion and having a bottom end coupled to the bottom receptacle and a top end removably couplable to the handle;
wherein a length of the fastening mechanism is adjustable so that a spacing between the bottom receptacle and the handle is adjustable;
wherein the handle comprises a projection configured to engage a second end of the pivotable finger, opposite the first end, for pivoting the pivotable finger about an axis and releasing the anchor from the plurality holes of the linear rack when the handle is pivoted with respect to the first fastening portion.

* * * * *